(12) United States Patent
Kobayashi et al.

(10) Patent No.: US 11,709,940 B2
(45) Date of Patent: Jul. 25, 2023

(54) FIRMWARE REWRITING APPARATUS, FIRMWARE REWRITING METHOD, AND NON-TRANSITORY COMPUTER READABLE MEDIUM STORING PROGRAM

(71) Applicant: NEC Corporation, Tokyo (JP)

(72) Inventors: Toshiki Kobayashi, Tokyo (JP); Takayuki Sasaki, Tokyo (JP); Yusuke Morita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 130 days.

(21) Appl. No.: 17/436,736

(22) PCT Filed: Mar. 18, 2019

(86) PCT No.: PCT/JP2019/011174
§ 371 (c)(1),
(2) Date: Sep. 7, 2021

(87) PCT Pub. No.: WO2020/188700
PCT Pub. Date: Sep. 24, 2020

(65) Prior Publication Data
US 2022/0188420 A1 Jun. 16, 2022

(51) Int. Cl.
*G06F 9/44* (2018.01)
*G06F 8/70* (2018.01)
(Continued)

(52) U.S. Cl.
CPC .............. *G06F 21/572* (2013.01); *G06F 8/70* (2013.01); *G06F 21/577* (2013.01); *G06F 21/56* (2013.01)

(58) Field of Classification Search
CPC ...... G06F 21/572; G06F 21/577; G06F 21/56; G06F 8/70
See application file for complete search history.

(56) References Cited

U.S. PATENT DOCUMENTS

2007/0100936 A1   5/2007  Lum
2020/0380124 A1*  12/2020 Yavuz ................. G06F 21/562

FOREIGN PATENT DOCUMENTS

JP   2002-532784 A   10/2002
JP   2008-084275 A    4/2008
(Continued)

OTHER PUBLICATIONS

Paola Pierleoni et al., Amazon, Google and Microsoft Solutions for IoT: Architectures and a Performance Comparison, Dec. 2019, [Retrieved on Jan. 27, 2023], Retrieved from the internet: <URL: https://ieeexplore.ieee.org/stamp/stamp.jsp?tp=&arnumber=8938723> 16 Pages (5455-5470) (Year: 2019).*

(Continued)

*Primary Examiner* — Anibal Rivera
(74) *Attorney, Agent, or Firm* — Sughrue Mion, PLLC

(57) ABSTRACT

According to an example embodiment, a firmware rewriting apparatus includes: call position specifying means for specifying, among instructions described in a program of firmware stored in a memory, the instructions for changing a control flow; free area specifying means for specifying a free area in a storage area of the memory in which the program is not stored; and program rewriting means for rewriting the instruction specified by the call position specifying means into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified by the free area specifying means.

19 Claims, 11 Drawing Sheets

(51) Int. Cl.
  *G06F 21/57* (2013.01)
  *G06F 21/56* (2013.01)

(56) References Cited

FOREIGN PATENT DOCUMENTS

| JP | 2011-164972 A | 8/2011 |
| JP | 2017-102561 A | 6/2017 |
| JP | 6338796 B1 | 6/2018 |

OTHER PUBLICATIONS

International Search Report for PCT Application No. PCT/JP2019/011174, dated Jun. 4, 2019.

Kishikawa Takeshi et al., "Proposal of Security ECU to protect In-Vehicle Network: Updatable CAN Protection Method using HW/SW Cooperation and Evaluation of the Method", 2015 Symposium on Cryptography and Information Security (SCI2015). Jan. 23, 2015, pp. 1-10.

JP Office Action for JP Application No. 2021-506852, dated Nov. 22, 2022 with English Translation.

\* cited by examiner

EXAMPLE BEFORE REWRITING IS PERFORMED

EXAMPLE BEFORE REWRITING IS PERFORMED

```
<main>:
        ...
        0x1010: BL <func_1>
        ...
        0x1020: BL <func_2>

<func_1>:
        ...
        0x2010: BX LR
<func_2>:
        ...
        0x3010: BX LR
```

Fig. 5

EXAMPLE AFTER REWRITING IS PERFORMED

```
<main>:
    ...
    0x1010: BL <check_1>
    ...
    0x1020: BL <check_2>

<func_1>:
    ...
    0x2010: BX LR
<func_2>:
    ...
    0x3010: BX LR
...
```

```
<check_1>:
    0x4010: PUSH {R7, LR}
    ... (EXECUTE SECURITY CHECK)
    0x4020: BL <func_1>
    0x4024: POP {R7, PC}

<check_2>:
    0x5010: PUSH {R7, LR}
    ... (EXECUTE SECURITY CHECK)
    0x5020: BL <func_2>
    0x5024: POP {R7, PC}
...
```

Fig. 6

EXAMPLE BEFORE REWRITING IS PERFORMED

```
<main>:
      ...
      0x1010: BL <func_1>
      ...
      0x1020: BL <func_2>

<func_1>:
      ...
      0x2010: BX LR
<func_2>:
      ...
      0x3010: BX LR
```

Fig. 7

EXAMPLE AFTER REWRITING IS PERFORMED

```
<main>:
    ...
    0x1010: BL <check>
    ...
    0x1020: BL <check>
<func_1>:
    ...
<func_2>:
    ...
```

```
<check>:
    OMITTED

<table>:
    0x5000: 0x1010+4
    0x5002: <func_1>
    0x5004: 0x1020+4
    0x5006: <func_2>
...
```

Fig. 8

FIRMWARE REWRITING APPARATUS, FIRMWARE REWRITING METHOD, AND NON-TRANSITORY COMPUTER READABLE MEDIUM STORING PROGRAM

This application is a National Stage Entry of PCT/JP2019/011174 filed on Mar. 18, 2019, the contents of all of which are incorporated herein by reference, in their entirety.

TECHNICAL FIELD

The present disclosure relates to a firmware rewriting apparatus, a firmware rewriting method, and a non-transitory computer readable medium storing a program.

BACKGROUND ART

With the adoption of the Internet of Things (IoT) in embedded devices, the incorporation of security checks (such as a tampering detection and a policy violation check) into existing IoT-enabled embedded devices has been discussed. However, in an existing embedded device, it is difficult to change the source code and changes are limited to a change of firmware or binary data in an executable format, and it is thus difficult to incorporate a security check function.

For example, Patent Literature 1 discloses, as part of security measures, a conversion apparatus that converts a program so that it stops execution of the program when an attack taking advantage of a vulnerability in software is detected.

CITATION LIST

Patent Literature

Patent Literature 1: Japanese Patent No. 6338796

SUMMARY OF INVENTION

Technical Problem

However, in Patent Literature 1, there is a problem that only the execution of the program is stopped when an attack thereon is detected, and hence security checks cannot be periodically performed even in a state where it is not known whether or not the program has been attacked.

The present disclosure has been made in order to solve the above problem. That is, an object of the present disclosure is to provide a firmware rewriting apparatus and a non-transitory computer readable medium storing a program that are capable of incorporating a security check function into an existing IoT-enabled embedded device.

Solution to Problem

A firmware rewriting apparatus according to the present disclosure includes: call position specifying means for specifying, among instructions described in a program of firmware stored in a memory, the instructions for changing a control flow; free area specifying means for specifying a free area in a storage area of the memory, the program not being stored in the free area; and program rewriting means for rewriting the instruction specified by the call position specifying means into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified by the free area specifying means.

Further, a firmware rewriting method according to the present disclosure includes: a call position specifying step of specifying, among instructions described in a program of firmware stored in a memory, the instructions for changing a control flow; a free area specifying step of specifying a free area in a storage area of the memory, the program not being stored in the free area; and a program rewriting step of rewriting the instruction specified in the call position specifying step into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified in the free area specifying step.

Further, a non-transitory computer readable medium according to the present disclosure stores a program for causing a computer to execute: call position specifying processing of specifying, among instructions described in a program of firmware stored in a memory, the instructions for changing a control flow; free area specifying processing of specifying a free area in a storage area of the memory, the program not being stored in the free area; and program rewriting processing of rewriting the instruction specified in the call position specifying processing into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified in the free area specifying processing.

Advantageous Effects of Invention

According to the present disclosure, it is possible to provide a firmware rewriting apparatus, a firmware rewriting method, and a non-transitory computer readable medium storing a program that are capable of incorporating a security check function into an existing IoT-enabled embedded device.

BRIEF DESCRIPTION OF DRAWINGS

FIG. 5 is a diagram showing a second example of a program of firmware before rewriting of it is performed by the firmware rewriting apparatus shown in FIG. 1;

FIG. 6 is a diagram showing a second example of the program of the firmware after rewriting of it is performed by the firmware rewriting apparatus shown in FIG. 1;

FIG. 7 is a diagram showing a third example of a program of firmware before rewriting of it is performed by the firmware rewriting apparatus shown in FIG. 1;

FIG. 8 is a diagram showing a third example of the program of the firmware after rewriting of it is performed by the firmware rewriting apparatus shown in FIG. 1;

DESCRIPTION OF EMBODIMENTS

Figure 1:
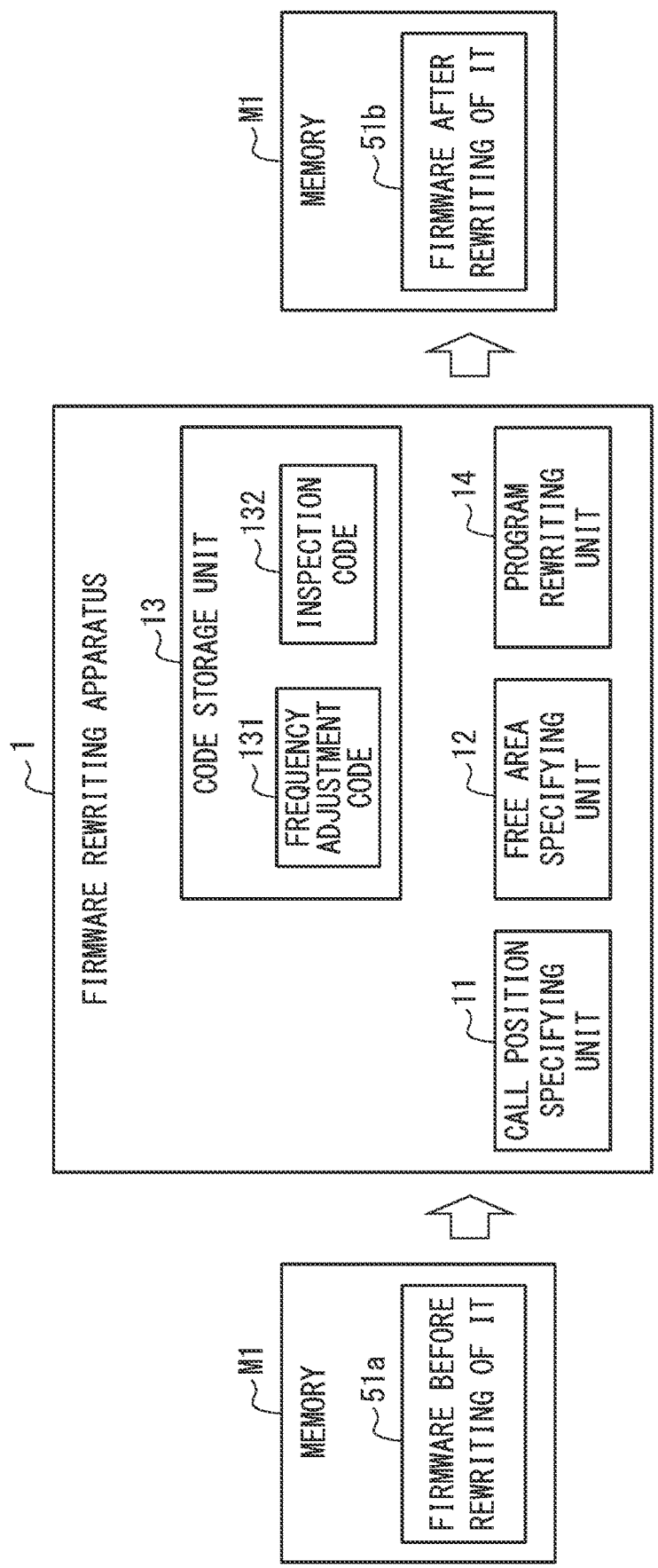
FIG. 1 is a block diagram showing a configuration example of a firmware rewriting apparatus according to a first example embodiment.

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference numerals or symbols, and redundant descriptions thereof will be omitted.

In the following example embodiments, when necessary, the present disclosure is explained by using separate sections or separate example embodiments. However, those example embodiments are not unrelated with each other, unless otherwise specified. That is, they are related in such a manner that one example embodiment is a modified example, an application example, a detailed example, or a supplementary example of a part or the whole of another example embodiment. Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following example embodiments, their components (including operation steps and the like) are not necessarily indispensable except for cases where the component is explicitly specified or the component is obviously indispensable based on its principle. Similarly, in the following example embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

First Example Embodiment

Figure 2:
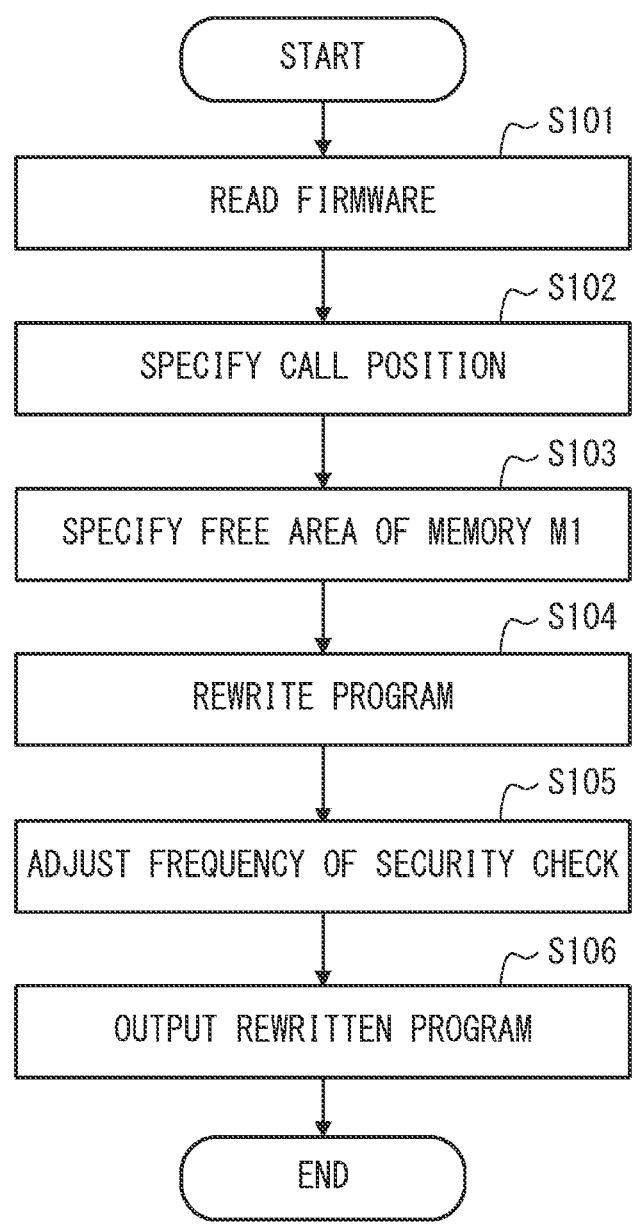
FIG. 2 is a flowchart showing an example of an operation of the firmware rewriting apparatus shown in FIG. 1.

FIG. 1 is a block diagram showing a configuration example of a firmware rewriting apparatus 1 according to a first example embodiment. Further, FIG. 2 is a flowchart showing an example of an operation of the firmware rewriting apparatus 1. The firmware rewriting apparatus 1 rewrites, for example, firmware of an existing IoT-enabled embedded device into firmware having a function of periodically performing a security check. By doing so, the firmware rewriting apparatus 1 enables incorporation of the function for periodically performing a security check into the existing IoT-enabled embedded device, thereby enabling improvements in the reliability of the existing embedded device. The details of the above operation will be described below.

As shown in FIG. 1, the firmware rewriting apparatus 1 includes a call position specifying unit (call position specifying means) 11, a free area specifying unit (free area specifying means) 12, a code storage unit (code storage means) 13, and a program rewriting unit (program rewriting means) 14.

The firmware rewriting apparatus 1 reads firmware 51a before rewriting of it, the firmware 51a being written, for example, into a memory M1 of the existing IoT-enabled embedded device (Step S101 in FIG. 2). The memory M1 is, for example, a flash ROM.

The call position specifying unit 11 specifies, among instructions described in a program of the firmware 51a before rewriting of it, instructions for changing a control flow as objects to be rewritten into call instructions of a frequency adjustment code 131 described later (Step S102 in FIG. 2).

Note that the instructions for changing the control flow are, for example, branch instructions including a CALL instruction (a call instruction) and a JMP instruction (a jump instruction) in an x86 architecture. Alternatively, the instructions for changing the control flow are branch instructions including a BL instruction and a B instruction in an ARM architecture. The BL and the B instructions in the ARM architecture correspond to the CALL and the JMP instructions in the x86 architecture, respectively.

Here, the call position specifying unit 11 may specify each of all the instructions for changing the control flow as an object to be rewritten into the call instruction of the frequency adjustment code 131. Alternatively, the call position specifying unit 11 may specify each of some (e.g., certain types of branch instructions) of the instructions for changing the control flow as the object to be rewritten into the call instruction of the frequency adjustment code 131.

The free area specifying unit 12 specifies a free area (i.e., a free area in the storage area of the memory M1 in which the program is not stored) in the firmware 51a before rewriting of it (Step S103 in FIG. 2). Note that the free area is the storage area of the memory M1 which does not affect operations of the firmware 51a before rewriting of it. The free area specifying unit 12 regards, for example, a predetermined area in which a plurality of zeros are continuously written into the storage area of the memory M1 as the free area. Alternatively, the free area specifying unit 12 regards a predetermined area that is not accessed by any program in the storage areas of the memory M1 as the free area.

The program rewriting unit 14 rewrites the instruction specified by the call position specifying unit 11 into a call instruction of the frequency adjustment code 131. Further, the program rewriting unit 14 writes the frequency adjustment code 131 and an inspection code 132 corresponding to the call instruction of the frequency adjustment code 131 into the free area specified by the free area specifying unit 12 (Step S104 in FIG. 2).

Note that the frequency adjustment code 131 is a code for calling the inspection code 132 at a frequency (a cycle) corresponding to a frequency (a cycle) of calling the frequency adjustment code 131. Further, the inspection code 132 is a code for performing a security check of the program in response to a call from the frequency adjustment code 131. The frequency adjustment code 131 and the inspection code 132 are both stored in the code storage unit 13.

For example, the frequency adjustment code 131 is set so that when the number of times the frequency adjustment code 131 is called reaches a predetermined number N of times after the frequency adjustment code 131 calls the inspection code 132, it calls the inspection code 132 again. Alternatively, the frequency adjustment code 131 is set so that when the frequency adjustment code 131 is called at an interval of a predetermined period of time T or more after the frequency adjustment code 131 calls the inspection code 132, it calls the inspection code 132 again.

Here, when the frequency of a security check is different from a desired frequency, the program rewriting unit 14 adjusts the frequency of the security check by editing a set value of the frequency adjustment code 131 (Step S105).

For example, when the frequency of calling the frequency adjustment code 131 is high, and the frequency of the security check is higher than the desired frequency accordingly, the program rewriting unit 14 increases, for example, a value of the predetermined number N of times or the predetermined period of time T set in the frequency adjustment code 131. By doing so, the frequency of the security check becomes low so as to approach the desired frequency. In other words, the cycle of the security check becomes long so as to approach the desired cycle. Alternatively, when the frequency of calling the frequency adjustment code 131 is low, and the frequency of the security check is lower than the desired frequency accordingly, the program rewriting unit 14 reduces, for example, the value of the predetermined number N of times or the predetermined period of time T set in the frequency adjustment code 131. By doing so, the frequency of the security check becomes high so as to approach the desired frequency. In other words, the cycle of the security check becomes short so as to approach the desired cycle.

Note that the program rewriting unit 14 may determine the predetermined number N of times and the predetermined period of time T set in the frequency adjustment code 131 based on not only the frequency of calling the frequency adjustment code 131 but also an execution time of the security check. For example, when it is determined that the execution time of the security check is too long, the program rewriting unit 14 increases the value of the predetermined number N of times or the predetermined period of time T. By doing so, the frequency of the security check is reduced, so that an operation delay due to the security check is prevented or reduced.

In this example embodiment, although a description has been given of an example in which after the frequency adjustment code 131 and the inspection code 132 are written into the free area specified by the free area specifying unit 12, the set value (e.g., the predetermined number N of times or the predetermined period of time T) of the frequency adjustment code 131 is edited, the present disclosure is not limited thereto. When information (e.g., information about the frequency of calling the frequency adjustment code 131) obtained by actually executing the program is not required, the set value of the frequency adjustment code 131 may be edited before the frequency adjustment code 131 and the inspection code 132 are written into the free area.

After Step S105, the firmware rewriting apparatus 1 outputs a firmware 51*b* after rewriting of it (Step S106).

As described above, the firmware rewriting apparatus 1 according to this example embodiment rewrites, for example, firmware of an existing IoT-enabled embedded device into firmware having a function of periodically performing a security check. By doing so, the firmware rewriting apparatus 1 enables incorporation of the function for periodically performing a security check into the existing IoT-enabled embedded device, thereby enabling improvements in the reliability of the existing embedded device.

Example of Firmware Rewriting

Next, several examples of firmware rewriting will be described. Note that, in the examples described below, it is assumed that the ARM architecture is used. Further, in the examples described below, the details of the frequency adjustment are omitted in order to make the descriptions simple.

Here, a "BL <func>" instruction and a "BX LR" instruction in the ARM architecture correspond to a "CALL <func>" instruction and a "RET" instruction in the x86 architecture, respectively. Note that <func> of the "BL <func>" instruction indicates a start address value of a func function. Further, <check> of a "BL <check>" instruction indicates a start address value of a check function in which a code for performing a security check (including a frequency adjustment) is described.

Example of Firmware Rewriting (Part 1)

Figure 3:
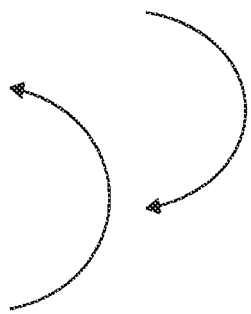
FIG. 3 is a diagram showing a first example of a program of firmware before rewriting of it is performed by the firmware rewriting apparatus shown in FIG. 1.
Figure 4:
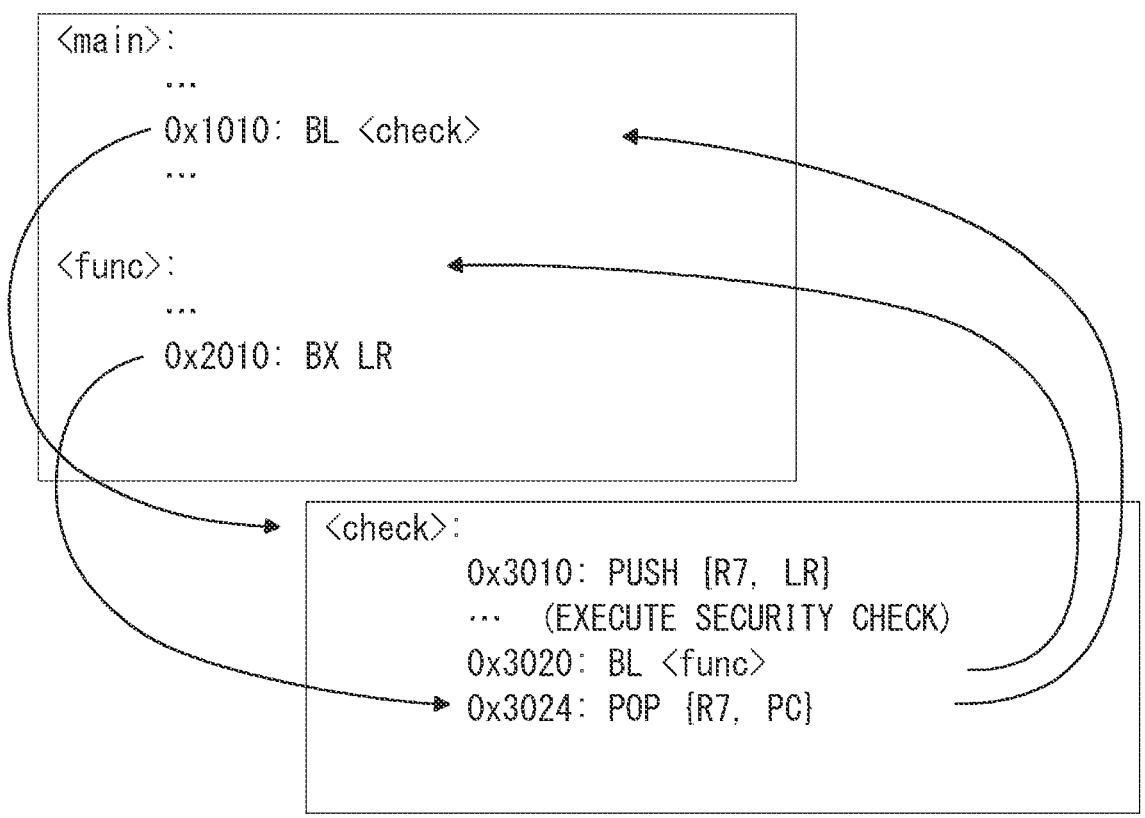
FIG. 4 is a diagram showing a first example of the program of the firmware after rewriting of it is performed by the firmware rewriting apparatus shown in FIG. 1.

FIGS. 3 and 4 are diagrams respectively showing a first example of a program of firmware before rewriting of it is performed by the firmware rewriting apparatus 1 and a first example of the program of the firmware after rewriting of it is performed by the firmware rewriting apparatus 1. In this example, a main function and one func function are shown in the program of the firmware.

First, in the program of the firmware before rewriting of it shown in FIG. 3, the "BL <func>" instruction is executed in the main function, whereby the func function is called. At this time, an address value next to the address value of the "BL <func>" instruction is stored in a link register (LR) of the "BX LR" instruction as a return destination address. Therefore, when the "BX LR" instruction is executed at the end of the func function, processing is transferred to the caller (the return destination address stored in the LR) of the main function.

Meanwhile, in the program of the firmware after rewriting of it shown in FIG. 4, the "BL <func>" instruction, which is a branch instruction, is rewritten into the "BL <check>". Therefore, the "BL <check>" instruction is executed, whereby the check function is called. Note that, in the check function, the link register (LR) PUSHed in a program counter (PC) is POPped from the PC. Accordingly, in the check function, after the security check is executed, processing goes through the func function and then transferred to the caller of the main function.

<<Example of Firmware Rewriting (Part 2)>>

FIGS. 5 and 6 are diagrams respectively showing a second example of a program of firmware before rewriting of it is performed by the firmware rewriting apparatus 1 and a second example of the program of the firmware after rewriting of it is performed by the firmware rewriting apparatus 1. In this example, in the program of the firmware, the main function and n (n is an integer of 2 or greater; in this example, n=2) of func_1 to func_n functions are shown.

First, in the program of the firmware before rewriting of it shown in FIG. 5, a "BL <func_1>" instruction is executed in the main function, whereby the func_1 function is called. At this time, an address value next to the address value of the "BL <func 1>" instruction is stored in the link register (LR) of the "BX LR" instruction as a return destination address. Therefore, when the "BX LR" instruction is executed at the end of the func_1 function, processing is transferred to the caller (the return destination address stored in the LR) of the main function. Similarly, a "BL <func_2>" instruction is executed in the main function, whereby the func_2 function is called. At this time, an address value next to the address value of the "BL <func_2>" instruction is stored in the link register (LR) of the "BX LR" instruction as a return destination address. Therefore, when the "BX LR" instruction is executed at the end of the func_2 function, processing is transferred to the caller (the return destination address stored in the LR) of the main function.

Meanwhile, in the program of the firmware after rewriting of it shown in FIG. 6, the "BL <func_1>" instruction, which is a branch instruction, is rewritten into a "BL <check 1>", and the "BL <func 2>" instruction is rewritten into a "BL <check_2>". Therefore, the "BL <check_1>" instruction is executed, whereby a check function_1 is called, while the "BL <check 2>" instruction is executed, whereby a check function_2 is called. Since the check_1 and the check_2 functions are each basically similar to the check function, the descriptions thereof will be omitted.

As described above, in this example, a plurality of branch instructions "BL <func_1>" and "BL <func_2>" are rewritten into the "BL <check 1>" and the "BL <check_2>", respectively. Therefore, in this example, a number of the functions check_1 and check_2 for a security check are used, the number corresponding to the number of branch instructions.

<<Example of Firmware Rewriting (Part 3)>>

Figure 9:
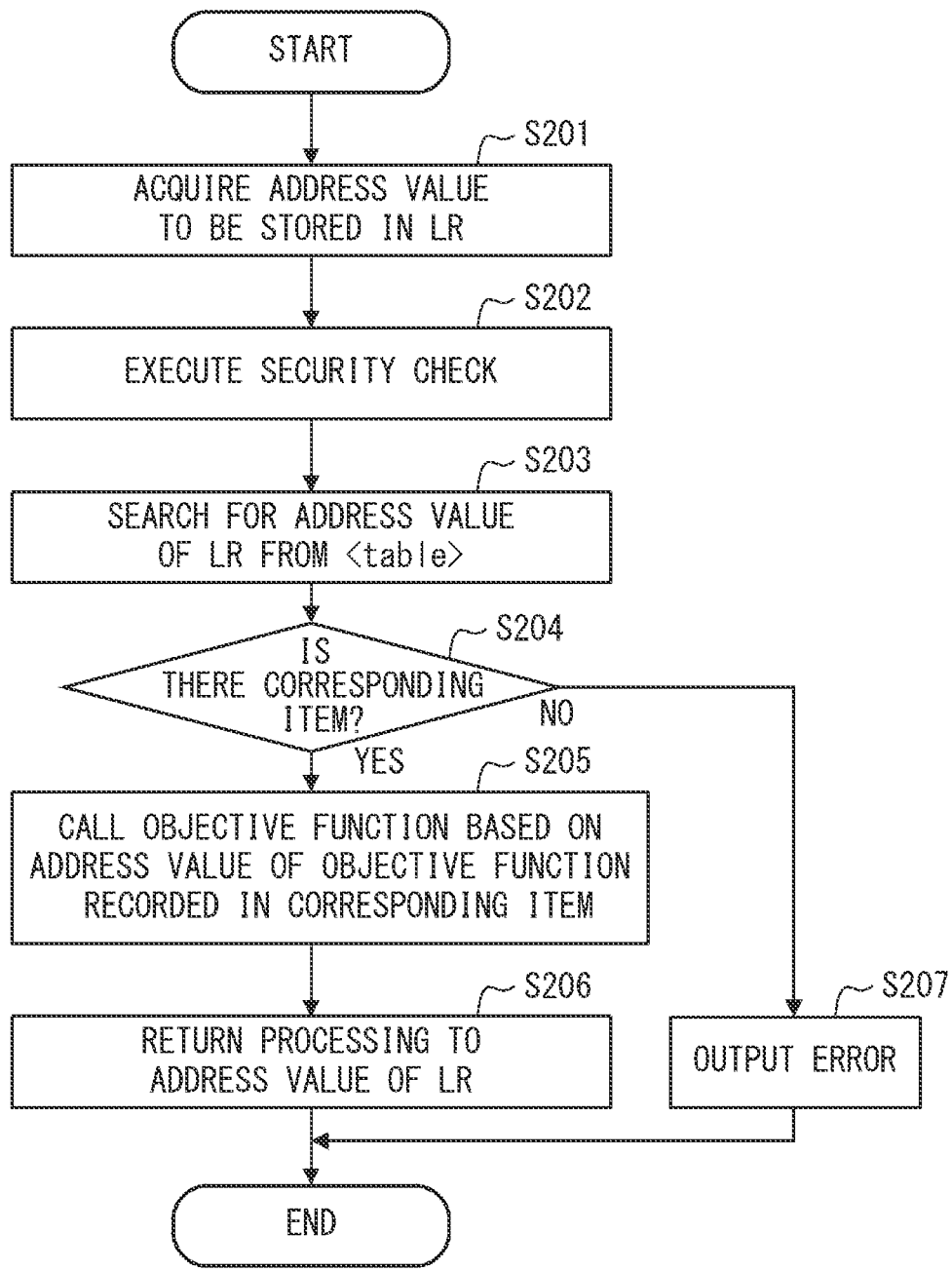
FIG. 9 is a flowchart showing an operation of the firmware rewriting apparatus shown in FIG. 1 to rewrite the program of the firmware before rewriting of it shown in FIG. 7 into the program of the firmware after rewriting of it shown in FIG. 8.

FIGS. 7 and 8 are diagrams respectively showing a third example of a program of firmware before rewriting of it is performed by the firmware rewriting apparatus 1 and a third example of the program of the firmware after rewriting of it is performed by the firmware rewriting apparatus 1. FIG. 9 is a flowchart showing an operation of the firmware rewriting apparatus 1 to rewrite the program of the firmware before rewriting of it shown in FIG. 7 into the program of the firmware after rewriting of it shown in FIG. 8.

Since the program of the firmware before rewriting of it shown in FIG. 7 is the same as the program of the firmware before rewriting of it shown in FIG. 5, the descriptions thereof will be omitted.

Meanwhile, in the program of the firmware after rewriting of it shown in FIG. 8, the "BL <func_1>" and the "BL <func_2>" instructions, which are branch instructions, are both rewritten into the "BL <check>". Further, in this example, a combination of the return destination address (i.e., the value stored in the LR by executing the "BL <check>" instruction) of the "BL <check>" instruction existing in the program and the start address value of an objective function is registered in a table (<table>).

For example, the "BL <check>" instruction of an address value of 0x1010 is executed, whereby the check function is called. At this time, the link register (LR) stores an address value of 0x1010+4 next to the address value of 0x1010 of the "BL <func>" instruction as the return destination address (Step S201). After that, in the check function, a security check is executed (Step S202). After the security check is executed, a combination including the address value of 0x1010+4 stored in the LR is searched for from the combinations registered in the table (Step S203). If there is the combination including the address value of 0x1010+4 stored in the LR (YES in Step S204), processing is transferred to the start address value of the func_1 function, which is an objective function corresponding to the address value of 0x1010+4 stored in the LR. That is, the function func_1 is called (Step S205). Note that if there is no combination including the address value of 0x1010+4 stored in the LR (NO in Step S204), an error is output (Step S207). After the func_1 function is executed, processing is transferred to the caller (the address value of 0x1010+4 stored in the LR) of the main function (Step S206).

As described above, in this example, even when a plurality of branch instructions "BL <func_1>" and "BL <func_2>" exist, the number of functions check for the security check can be reduced to one by managing them using the table.

Second Example Embodiment

A firmware rewriting apparatus 2 according to a second example embodiment will be described. In the firmware rewriting apparatus 2 according to this example embodiment, the call position specifying unit 11 specifies predetermined instructions among instructions for changing a control flow as objects to be rewritten into call instructions of the frequency adjustment code 131. In this case, the predetermined instructions are, for example, combinations of one or more instructions which are expected to be called less frequently and be appropriately subject to a security check (i.e., which are more likely to be called when a certain amount of time has passed or a specified function is performed) among the instructions for changing the control flow.

For example, the call position specifying unit 11 specifies each of some or all of the instructions described in respective interruption handlers described in a vector table among the instructions (e.g., the branch instructions including the CALL instruction and the JMP instruction) for changing the control flow as the object to be rewritten into the call instruction of the frequency adjustment code. Note that the aforementioned some or all of the instructions may be, for example, all the instructions, only the instruction to be executed first, or only the instructions to be executed first and last, but they are not limited thereto.

Alternatively, the call position specifying unit 11 specifies instructions that are included in a largest loop structure included in the main function among the instructions for changing the control flow as the object to be rewritten into the call instruction of the frequency adjustment code 131. Specifically, the call position specifying unit 11 analyzes the control flow (the flow of the program execution) of the main function, and extracts the largest loop structure from a result of the analysis. Then the call position specifying unit 11 specifies each of some or all of the instructions included in the largest loop structure among the instructions for changing the control flow as the object to be rewritten into the call instruction of the frequency adjustment code 131.

The configurations and operations of the firmware rewriting apparatus 2 other than the above ones are similar to those of the firmware rewriting apparatus 1, and thus the descriptions thereof will be omitted.

As described above, in the firmware rewriting apparatus 2 according to this example embodiment, the call position specifying unit 11 specifies predetermined instructions among the instructions for changing the control flow as the objects to be rewritten into the call instructions of the frequency adjustment code 131. By this configuration, the firmware rewriting apparatus 2 can reduce the frequency of calling the frequency adjustment code 131, so that it is possible to reduce the load on the execution of the frequency adjustment code 131.

For example, it is assumed that it is required for the frequency adjustment code 131 to be set so that, for example, when the frequency of calling the frequency adjustment code 131 is too high, one call of the inspection code 132 is made for every 1000 calls of the frequency adjustment code 131 made. In this case, the load on the execution of the frequency adjustment code 131 becomes large. On the other hand, when the frequency of calling the frequency adjustment code 131 is reduced, the frequency adjustment code 131 may be set so that, for example, one call of the inspection code 132 is made for every 10 calls of the frequency adjustment code 131 made. In this case, the load on the execution of the frequency adjustment code 131 is reduced.

<<Example of Firmware Rewriting>>

Figure 10:
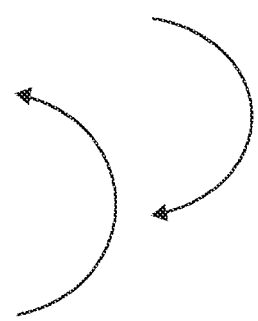
FIG. 10 is a diagram showing an example of a program of firmware before rewriting of it is performed by the firmware rewriting apparatus according to a second example embodiment.
Figure 11:
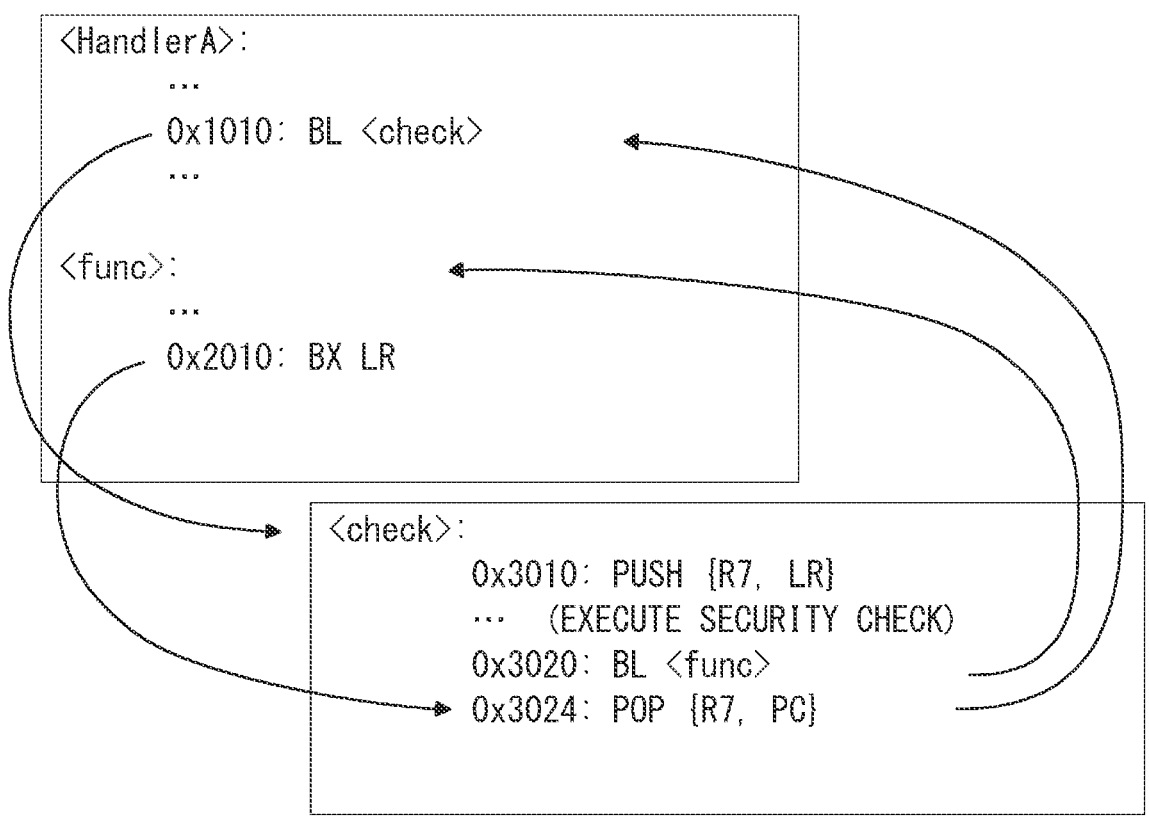
FIG. 11 is a diagram showing an example of the program of the firmware after rewriting of it is performed by the firmware rewriting apparatus according to the second example embodiment.

FIGS. 10 and 11 are diagrams respectively showing an example of a program of firmware before rewriting of it is performed by the firmware rewriting apparatus according to the second example embodiment and an example of the program of the firmware after rewriting of it is performed by the firmware rewriting apparatus according to the second example embodiment. Note that, in the examples described below, it is assumed that the ARM architecture is used. Further, in the examples described below, the details of the frequency adjustment are omitted in order to make the descriptions simple.

In this example, in the program of the firmware, a HandlerA function, which is a function of an interruption handler, and one func function are shown.

First, in the program of the firmware before rewriting of it shown in FIG. 10, the "BL <func>" instruction is executed in the HandlerA function, whereby the func function is called. At this time, an address value next to the address value of the "BL <func>" instruction is stored in the link register (LR) of the "BX LR" instruction as a return destination address. Therefore, when the "BX LR" instruction is executed at the end of the func function, processing is transferred to the caller (the return destination address stored in the LR) of the HandlerA function.

Meanwhile, in the program of the firmware after rewriting of it shown in FIG. 11, the "BL <func>" instruction, which is a branch instruction existing in the HandlerA function, is rewritten into the "BL <check>". Therefore, the "BL <check>" instruction is executed, whereby the check function is called. Note that, in the check function, the link register (LR) PUSHed in a program counter (PC) is POPped from the PC. Accordingly, in the check function, after the security check is executed, the processing goes through the func function and then processing is transferred to the caller of the HandlerA function.

Although the example embodiments of the present disclosure have been described in detail with reference to the drawings, the specific configurations are not limited to the above-described example embodiments, and various design changes and the like can be made without departing from the scope and spirit of the present disclosure. For example, a function of implementing the operations of the firmware rewriting apparatus may be composed and operated by a plurality of apparatuses connected through a network.

Although the present disclosure has been described as a hardware configuration in the aforementioned example embodiment, the present disclosure is not limited thereto. In the present disclosure, all or part of processing of the firmware rewriting apparatus can be implemented by causing a Central Processing Unit (CPU) to execute a computer program.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present disclosure has been described with reference to the example embodiments, the present disclosure is not limited to the above-described example embodiments. Various modifications that may be understood by those skilled in the art may be made to the configurations and details of the present disclosure within the scope of the disclosure.

REFERENCE SIGNS LIST

1 FIRMWARE REWRITING APPARATUS
2 FIRMWARE REWRITING APPARATUS
11 CALL POSITION SPECIFYING UNIT
12 FREE AREA SPECIFYING UNIT
13 CODE STORAGE UNIT
14 PROGRAM REWRITING UNIT
131 FREQUENCY ADJUSTMENT CODE
132 INSPECTION CODE
51a FIRMWARE BEFORE REWRITING OF IT
51b FIRMWARE AFTER REWRITING OF IT
M1 MEMORY

What is claimed is:

1. A firmware rewriting apparatus comprising:
at least one memory; and
at least one processor coupled to the at least one memory, the at least one processor being configured to:
specify, among instructions described in a program of firmware stored in a memory of an external device, the instructions for changing a control flow;
specify a free area in a storage area of the memory, the program not being stored in the free area; and
rewrite the instruction specified into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified.

2. The firmware rewriting apparatus according to claim 1, wherein the at least one processor is configured to:
specify each of all the instructions for changing the control flow as an object to be rewritten into the call instruction of the frequency adjustment code.

3. The firmware rewriting apparatus according to claim 1, wherein the at least one processor is configured to:
specify each of some or all of the instructions described in an interruption handler among the instructions for changing the control flow as the object to be rewritten into the call instruction of the frequency adjustment code.

4. The firmware rewriting apparatus according to claim 1, wherein the at least one processor is configured to:
specify each of some or all of the instructions that are included in a largest loop structure included in a main function among the instructions for changing the control flow as the object to be rewritten into the call instruction of the frequency adjustment code.

5. The firmware rewriting apparatus according to claim 1, wherein the frequency adjustment code is set so that when the number of times the frequency adjustment code is called reaches a predetermined number of times after the frequency adjustment code calls the inspection code, the frequency adjustment code calls the inspection code again.

6. The firmware rewriting apparatus according to claim 1, wherein the frequency adjustment code is set so that when the frequency adjustment code is called at an interval of a predetermined period of time or more after the frequency adjustment code calls the inspection code, the frequency adjustment code calls the inspection code again.

7. The firmware rewriting apparatus according to claim 1, wherein the frequency adjustment code is configured to call the inspection code at a frequency that is determined based on the frequency of calling the frequency adjustment code and an execution time of the security check.

8. The firmware rewriting apparatus according to claim 1, wherein the instructions for changing the control flow are at least one or more types of branch instructions including a call instruction and a jump instruction.

9. The firmware rewriting apparatus according to claim 1, wherein in the storage area of the memory, the free area is at least one of a predetermined area in which a plurality of zeros are continuously written and a predetermined area that is not accessed by any program.

10. A firmware rewriting method comprising:
a call position specifying step of specifying, among instructions described in a program of firmware stored in a memory, the instructions for changing a control flow;
a free area specifying step of specifying a free area in a storage area of the memory, the program not being stored in the free area; and
a program rewriting step of rewriting the instruction specified in the call position specifying step into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified in the free area specifying step.

11. The firmware rewriting method according to claim 10, wherein in the call position specifying step, each of all the instructions for changing the control flow is specified as an object to be rewritten into the call instruction of the frequency adjustment code.

12. The firmware rewriting method according to claim 10, wherein in the call position specifying step, each of some or all of the instructions described in an interruption handler among the instructions for changing the control flow is specified as the object to be rewritten into the call instruction of the frequency adjustment code.

13. The firmware rewriting method according to claim 10, wherein in the call position specifying step, each of some or all of the instructions that are included in a largest loop structure included in a main function among the instructions for changing the control flow is specified as the object to be rewritten into the call instruction of the frequency adjustment code.

14. The firmware rewriting method according to claim 10, wherein the frequency adjustment code is set so that when the number of times the frequency adjustment code is called reaches a predetermined number of times after the frequency adjustment code calls the inspection code, the frequency adjustment code calls the inspection code again.

15. The firmware rewriting method according to claim 10, wherein the frequency adjustment code is set so that when the frequency adjustment code is called at an interval of a predetermined period of time or more after the frequency adjustment code calls the inspection code, the frequency adjustment code calls the inspection code again.

16. The firmware rewriting method according to claim 10, wherein the frequency adjustment code is configured to call the inspection code at a frequency that is determined based on the frequency of calling the frequency adjustment code and an execution time of the security check.

17. The firmware rewriting method according to claim 10, wherein the instructions for changing the control flow are at least one or more types of branch instructions including a call instruction and a jump instruction.

18. The firmware rewriting method according to claim 10, wherein in the storage area of the memory, the free area is at least one of a predetermined area in which a plurality of zeros are continuously written and a predetermined area that is not accessed by any program.

19. A non-transitory computer readable medium storing a program for causing a computer to execute:
call position specifying processing of specifying, among instructions described in a program of firmware stored in a memory, the instructions for changing a control flow;
free area specifying processing of specifying a free area in a storage area of the memory, the program not being stored in the free area; and
program rewriting processing of rewriting the instruction specified in the call position specifying processing into a call instruction of a frequency adjustment code and writing the frequency adjustment code for calling an inspection code at a frequency corresponding to a frequency of calling the frequency adjustment code and the inspection code for performing a security check of the program in response to a call from the frequency adjustment code into the free area specified in the free area specifying processing.

* * * * *